United States Patent [19]

Crawford

[11] 4,455,930
[45] Jun. 26, 1984

[54] METHOD AND APPARATUS FOR DELIVERING TWINE TO A BALER KNOTTER

[75] Inventor: Alexander Crawford, Mississauga, Canada

[73] Assignee: Massey-Ferguson Industries Limited, Toronto, Canada

[21] Appl. No.: 419,683

[22] Filed: Sep. 20, 1982

Related U.S. Application Data

[63] Continuation-in-part of Ser. No. 295,897, Aug. 24, 1981, abandoned.

[30] Foreign Application Priority Data

Mar. 23, 1982 [CA] Canada .................................... 399213

[51] Int. Cl.³ ............................................ B65B 13/02
[52] U.S. Cl. .......................................... 100/3; 56/343;
100/5; 100/18; 100/40; 100/80; 100/172; 100/173; 100/176
[58] Field of Search ................. 100/5, 18, 40, 80, 172, 100/173, 176, 3, 17, 144, 155 R, 8; 56/343; 242/147 R

[56] References Cited

U.S. PATENT DOCUMENTS

| | | |
|---|---|---|
| 648,033 | 4/1900 | Kirshman et al. . |
| 648,039 | 4/1900 | Medlin . |
| 670,406 | 3/1901 | Kirshman et al. . |
| 702,201 | 6/1902 | Griffin et al. . |
| 705,135 | 7/1902 | Pope et al. . |
| 879,639 | 2/1908 | Haynes . |
| 902,976 | 11/1908 | Lee . |
| 931,474 | 8/1909 | Phelps . |
| 955,542 | 4/1910 | Phelps . |
| 3,254,911 | 6/1966 | Crawford .................. 100/22 X |
| 3,552,109 | 1/1971 | Murray et al. . |
| 4,062,280 | 12/1977 | Ankenman . |
| 4,074,623 | 2/1978 | White . |
| 4,118,918 | 10/1978 | White . |
| 4,142,746 | 3/1979 | White . |
| 4,175,487 | 11/1979 | Molitorisz . |
| 4,198,904 | 4/1980 | Cheale et al. . |
| 4,270,446 | 6/1981 | Molitorisz . |
| 4,273,034 | 6/1981 | Molitorisz . |

FOREIGN PATENT DOCUMENTS

116580 2/1930 Austria .................................... 100/80

*Primary Examiner*—Billy J. Wilhite
*Attorney, Agent, or Firm*—John C. Thompson

[57] ABSTRACT

Method and apparatus for delivering twine to a baler knotter. The baler (10) which performs the method includes a bale chamber (16) having a forward inlet end. A knotter (64) is disposed to one side of the bale chamber and the baler is of the type having feeding means including a pair of rollers (36) which are moved back and forth across the inlet end of the bale chamber. A portion (90) of the twine is supported on the lower feed roller as the rollers are moved back and forth across the inlet end of the bale chamber. A pickup needle (110 or 302) is associated with the knotter, and at the initiation of the tying cycle moves from an at rest position towards the lower roller to pick up the twine and then to a position above the twine disks (140) of the knotter to deliver the twine to the knotter and then returns to its at rest position. The twine is tensioned by a twine drag (144) and a pigtail type tensioning mechanism (146) both during the formation of a bale and during tying.

16 Claims, 20 Drawing Figures

METHOD AND APPARATUS FOR DELIVERING TWINE TO A BALER KNOTTER

CROSS REFERENCE TO RELATED APPLICATIONS

This application is a continuation-in-part of U.S. application Ser. No. 06/295,897 filed Aug. 24, 1981, now abandoned. Other related applications are U.S. application Ser. No. 06/276,448 filed June 22, 1981 and entitled "Method and Apparatus for Forming Bales" and U.S. application Ser. No. 06/295,881 filed Aug. 24, 1981 entitled "Baler" now U.S. Pat. No. 4,413,553.

FIELD OF THE INVENTION

The present invention relates generally to balers of the type which may be used for baling agricultural crops, and more particularly to a method and apparatus for delivering twine to a baler knotter disposed to one side of the bale chamber of the baler, the baler being of the type having feeding means for feeding fibrous material to the inlet end of the bale chamber, the feeding means including a pair of rollers which are moved back and forth across the inlet end of the bale chamber.

BACKGROUND OF THE INVENTION

Many forms of balers are well known today. The most commonly used field baler of today forms a rectangular bale by picking up crop material by means of a crop pickup, transferring the crop material laterally by means of packer fingers to the forward end of a bale chamber, and then compressing the crop material into a bale by means of a plunger which conventionally operates in the range of 50 to 100 strokes per minute. The bales are then tied off into lengths which generally vary from three to four feet in length. Most of these bales have a 14 or 16 inch by 18 inch cross section and can be manually handled after baling. Hay baled by machines of this type are of good quality and suitable for long term storage.

During the past 20 years efforts have been made to develop other bale packages which are more suitable for machine handling. One approach is the large rectangular baler of the types shown in U.S. Pat. Nos. 3,552,109 and 4,118,918. To produce large rectangular bales by the conventional baler system, such as used for the smaller 16 by 18 inch bales, a machine must have a relative heavy structure, and a power train capable of transmitting high torques due to the very high peak loads which occur for a small portion of each cycle when the plunger is completing its stroke. In addition, problems have been encountered when tying off such bales.

The manner in which both the small and large rectangular bales have been tied off is essentially the same. Thus, one end of a twine is held by a knotter, the twine then passing across the leading face of the bale and being held by a needle disposed on the side of the bale chamber opposite from the knotter. When the desired length of the bale has been attained, the tying mechanism is initiated at which point the needle carries an intermediate portion of the twine through the bale chamber to the knotter where the twine is cut and tied about the bale. Customarily, the bale is provided with two or three knotters, although for larger balers more knotters may be employed. While this mechanism performs in a generally satisfactory manner on the smaller balers, difficulties have been encountered with larger balers.

In addition to the various commercial types of balers referred to above, other prior art forms of balers have been suggested. One such type is shown in the Molitorisz U.S. Pat. No. 4,175,487. This form of baler utilizes cooperating rollers which are moved back and forth across the inlet end of the bale chamber. A baler of this general type may be used for both forming small rectangular bales and large rectangular bales. In addition, it has been found that balers of this type have relatively low power requirements. However, the use of a conventional twine needle unnecessarily complicates the design of such a baler, and in addition increases the power requirements of the baler when bringing the twine into the knotter for tying.

OBJECTS AND SUMMARY OF THE PRESENT INVENTION

In general, it is an object of this invention to provide a novel method and apparatus for delivering twine to the knotter of a baler.

More specifically, it is an object of this invention to provide a method and apparatus for delivering twine to a baler knotter disposed to one side of a bale chamber of a baler, the baler being of the type having a pair of feed rollers which delivers fibrous material to the inlet end of the bale chamber, the feed rollers being moved back and forth across one end of the bale chamber. In accordance with this invention a portion of the twine is carried on one of the rollers as it is moved back and forth across the inlet end of the bale chamber. When the bale is completed a pickup needle, mounted adjacent to the knotter, picks up the twine from the roller and brings it up to the knotter for subsequent tying and cutting. In addition, the twine is maintained under tension while it is being carried by the roller and also during knotting.

The above objects and other objects and advantages of this invention will be apparent from following detailed description taken in conjunction with the accompanying drawings in which a preferred form of this invention is illustrated.

DESCRIPTION OF A FIRST EMBODIMENT

Figure 1:
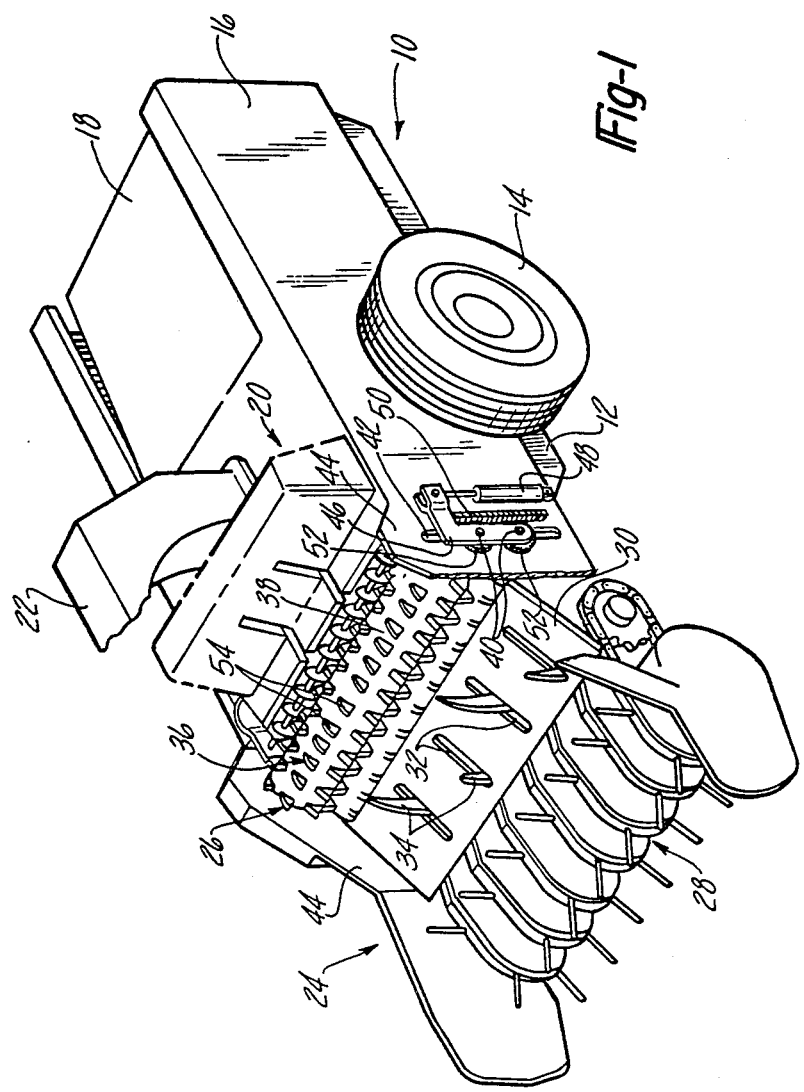
FIG. 1 is a perspective view of a first embodiment of a baler in which the principles of the present invention may be incorporated.
Figure 2:
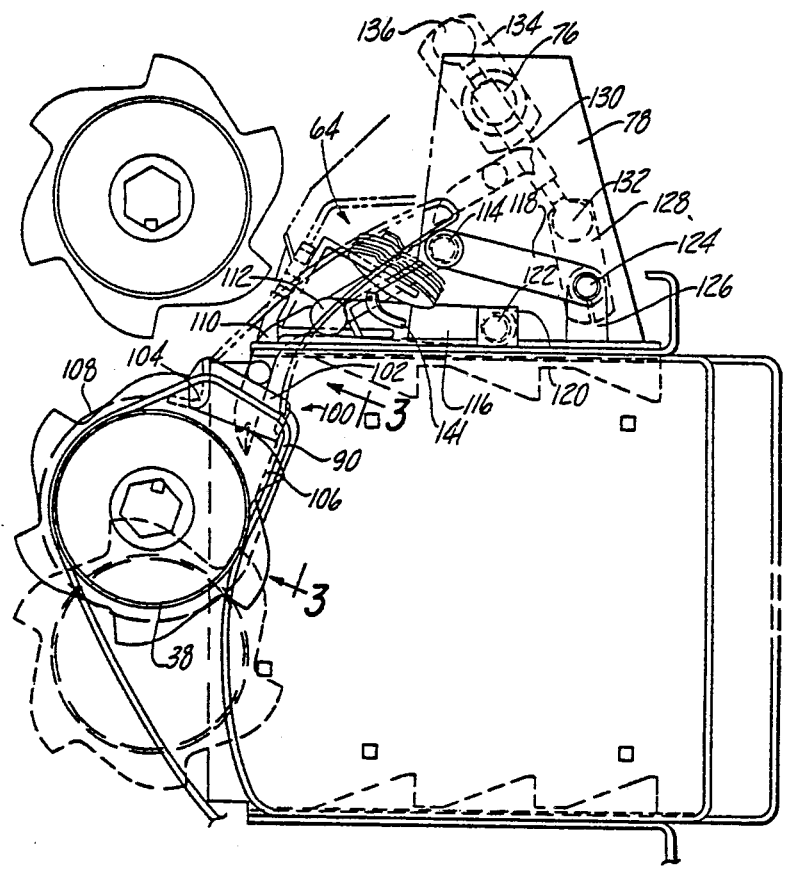
FIG. 2 is a section through a portion of the baler shown in FIG. 1 illustrating a first embodiment of a twine pickup needle and supporting linkage in that position it occupies when picking up twine from a cooperating roller, and also showing the manner in which the twine is carried by the cooperating roller. Only a portion of the knotter is shown in this view.

Referring first to FIG. 1, a baler in which the principles of this invention may be incorporated is indicated generally at 10. The baler includes a frame 12 to which are secured ground engaging wheels 14. Mounted on the frame 12 is a bale chamber or bale case 16, the bale chamber being provided with a generally conventional tension rail mechanism 18. Two or more knotters, as well as the twine pickup needles and supporting linkage, are mounted at the forward upper end of the bale chamber generally in the space indicated by reference numeral 20. A forwardly extending tongue 22 is secured to the baler 10, the forward end of the tongue normally being secured to the drawbar of a tractor when the baler is in operation. The baler is also provided with conveying means, indicated generally at 24, and feeding means, indicated generally at 26, the feeding means being disposed between the conveying means and inlet end of the bale chamber 16.

Figure 16:
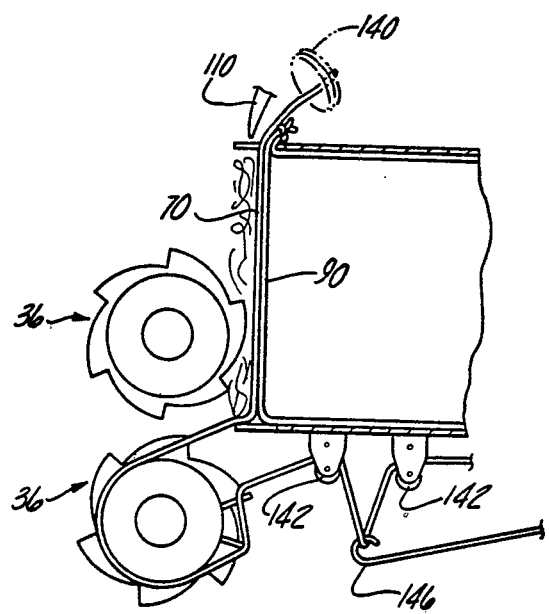

In the embodiment illustrated in FIG. 1 the conveying means includes a crop pickup indicated generally at 28, and a platform 30 over which a mat of crop material may be conveyed. To this end the platform 30 is provided with longitudinal slots 32 through which packer fingers or tines 34 project, the packer fingers moving in a clockwise orbital path when viewed from the left hand side of the machine to convey the mat of crop material rearwardly into the bite of a pair of feed rollers 36 which form part of the feeding means. Each of the feed rollers includes a cylindrical section 38 supported by concentric right and left hand spaced apart stub shafts 40 (only the left hand stub shafts 40 being shown in FIG. 1). The stub shafts project through vertically extending slots 42 formed in the right and left forward side walls 44. Each of the stub shafts 40 is journalled within a common support 46 which can be moved upwardly and downwardly by means of a hydraulic cylinder 48, only the left hand support 46 and cylinder 48 being illustrated. The right and left hand hydraulic cylinders are operated in unison. To this end, each of the cylinders 48 is a slave cylinder driven by means of a master cylinder or cylinders (not shown) of equal displacement. The master cylinder or cylinders is in turn caused to be extended or retracted by a crank. During the movement of the rollers 36 back and forth across the inlet end of the bale chamber 16 rotational movement is imparted to the rollers by a rack 50 and pinions 52. In this embodiment the feed rollers 36 are provided with a plurality of saw tooth like elements 54 which cause the mat of crop material conveyed to the feeding mechanism to be fed into the baler as the rollers are moved back and forth across the inlet end of the bale chamber. Thus, as can be seen from the figures, as the rollers 36 are moved from the lower position illustrated in FIG. 10 through the intermediate position illustrated in FIG. 11 to their upper position illustrated in FIG. 12 both of the rollers will be caused to be rotated in a clockwise direction as viewed from the left hand side of the machine. It should be apparent that adjacent surfaces of the rollers 36 are moving in opposite directions, and thus as the rollers are being moved upwardly the adjacent surface of the lower roller is moving in a rearward direction toward the inlet end of the bale chamber while the adjacent surface of the upper roller is being moved away from the inlet end of the bale chamber. The sawtooth-like elements 54 carried by the rollers 36 will feed more aggressively in one direction than the other. Thus, as the mat of fibrous crop material is conveyed rearwardly into the bite of the rollers 36, opposed surfaces of the mat are simultaneously engaged by the sawtooth-like elements. During upward movement the mat will be more aggressively engaged by the sawtooth-like elements 54 carried by the lower roller then it will be engaged by the sawtooth-like elements 54 carried by the upper roller and thus the mat of crop material will be fed into the bale chamber and compacted by the lower roller as it moves upwardly. As the rollers then move downwardly from their upper position (FIG. 12) to their lower position (FIG. 16 or FIG. 10) the rolls 36 will now be rotated in a counterclockwise direction. Again it should be apparent that the mat of crop material which is being engaged by oppositely moving sawtooth-like elements will be fed in a rearward direction by the more aggressive action of the sawtooth-like elements 54 on the top feed roller. In this regard it should be noted that the sharply inclined leading surface of each of the sawtooth-like elements 54 will more aggressively feed the mat of crop material than the slightly inclined trailing surfaces. Thus, when the rollers are being moved in an upward direction, even through the adjacent surface of the upper roller is moving away from the bale chamber the mat of fibrous material will be more aggressively engaged by the lower adjacent surface and fed in a rearward direction. As the subject matter of the feed mechanisms and other components of the baler are the subject of U.S. patent application Ser. No. 276,448 filed June 22, 1981 they will not be described in further detail.

Figure 18:
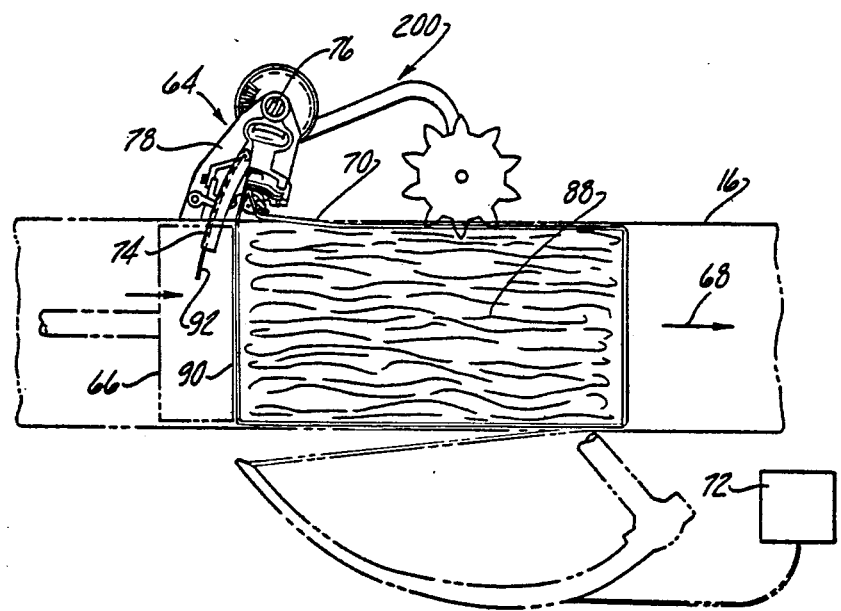
FIG. 18 is a view of a portion of a prior art baler and knotting mechanism.

Reference will now be made to FIG. 18 which discloses in general the prior art system for delivering twine to a baler knotter. The knotter 64 shown in this figure is the type illustrated in U.S. Pat. No. 3,254,911 and, as the twine delivery system of this invention is used with a knotter of this type, the subject matter of the knotter disclosed in this patent is incorporated herein by reference thereto. In the prior art device, as cut crop material is picked up from the ground, it is fed in successive batches or charges into the inlet of the baling chamber 16, and the batches of material are compressed into bales by a reciprocating plunger 66 which also advances the bales along the chamber towards the outlet in the direction of arrow 68. A portion or length 70 of twine extends across the baling chamber in the path of the leading end of each bale, this portion 70 being called the primary twine. It extends from a supply reel or container 72, passes through a needle 74, and the end of the primary twine is held by the knotting mechanism 64, which is shown being mounted on the top wall of the bale chamber 16. The knotting mechanism 64 is driven by a knotter shaft 76 which is rotatably journalled in a support frame 78. The shaft 76 is intermittently caused to be rotated by a conventional bale length metering and actuating mechanism. When the input shaft 76 is rotated, the needle 74, driven by the input shaft 76, moves from the dwell or at rest position indicated by phantom lines in FIG. 18 to the full throw position shown in full lines in FIG. 18 to wrap the twine around the bottom and trailing end of the bale 88 and to place the portion 90 of the twine in the knotting mechanism 64. (The portion of the twine which is carried past the trailing end of the bale is called the secondary twine.) During the operation of the knotting mechanism 64 the twine is cut and a knot is formed between the primary and secondary end portions of the twine. In addition, the cut portion is retained by the knotter 64 leaving a new primary portion extending across the path of the succeeding bale to be formed. The needle will return to its dwell position at the completion of the tying cycle. The rotation of the knotter shaft 76 is coordinated with the reciprocation of the plunger 66 to ensure that the plunger does not bring a new charge of material into the bale chamber when the needle 74 is in its full throw position.

In the prior art bale tying sequence described briefly above it can be seen that the needle 74 performs a dual purpose. Thus, it carries or supports a secondary portion of the twine during the bale forming operation and, upon completion of the bale, it then transfers the secondary portion of the twine into the knotter for subsequent tying and cutting. At the end of this operation it then brings the twine back across the leading end of the next succeeding bale to be formed wherein the cycle is repeated. In accordance with the principles of this invention the twine is not carried by a needle during the bale forming operation, but by one of the feed rollers. In addition, a needle of special construction is utilized to pick up the twine from the twine carrying roller and bring it up into the conventional knotter mechanism during the tying cycle. A first embodiment of this mechanism is illustrated in FIGS. 2 through 9.

As previously noted in the embodiment of the baler illustrated in FIG. 1 each of the feed rollers 36 is provided with a plurality of saw tooth like feed elements 54. As can best be seen in FIG. 9 the saw tooth like feed elements 54 are in a plurality of spaced apart arrays which extend generally perpendicular to the axis of the cylindrical section 38. In accordance with this invention, for each knotter a secondary twine supporting mechanism, indicated generally at 100, is provided on the roller spaced furthest away from the knotters, the secondary twine supporting mechanism being disposed between two adjacent arrays of saw tooth like feed elements. To this end, side extensions 102 are provided, the side extensions lying in the same plane as the associated saw tooth like feed elements 54. An apertured twine carrier plate 104 is welded or otherwise rigidly secured between adjacent side extensions 102. A support member 106 is also rigidly secured between the extensions 102. Carried on the support member 106 as well as upon that portion of the cylindrical section 38 which extends between the support member 106 and the carrier plate 104 are outwardly extending parallel spaced apart twine channel defining members 108. The foregoing structure carries the secondary portion of the twine, and it can be seen that the portion of the secondary twine which extends between the aperture in plate 104 and the end of the twine channel defining members 108 carried by support member 106 is spaced away from the adjacent surface of the cylindrical section 38. This spaced away portion of the secondary twine can be engaged by a pickup needle 110.

Figure 4:
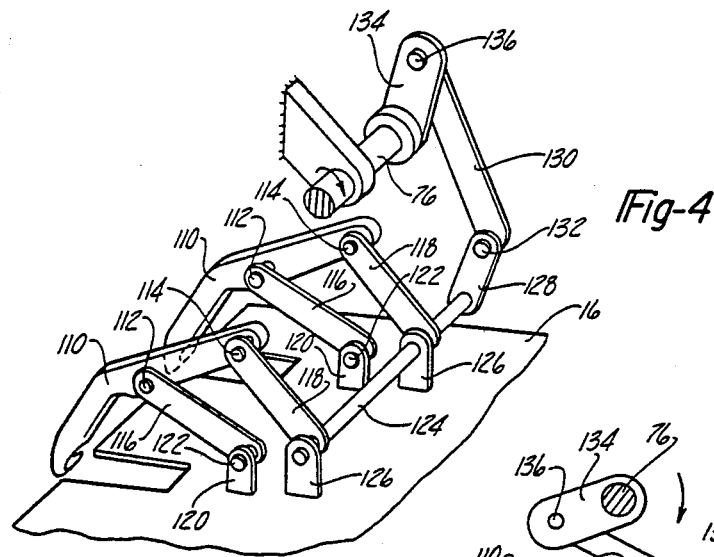
FIG. 4 is a perspective view of the first embodiment of the twine pickup needles and their supporting linkage, the knotters being eliminated for purposes of clarity.
Figure 5:
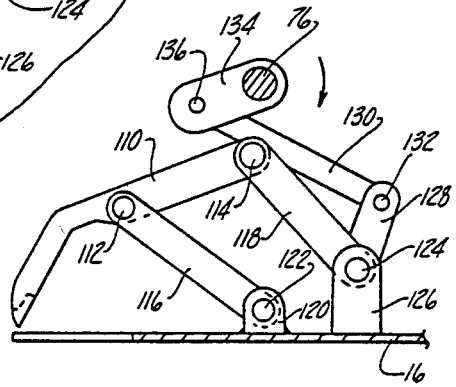
FIGS. 5, 6 and 7 are side views of the twine pickup needle and supporting linkage shown in FIG. 4 and illustrating various operative positions.
Figure 6:
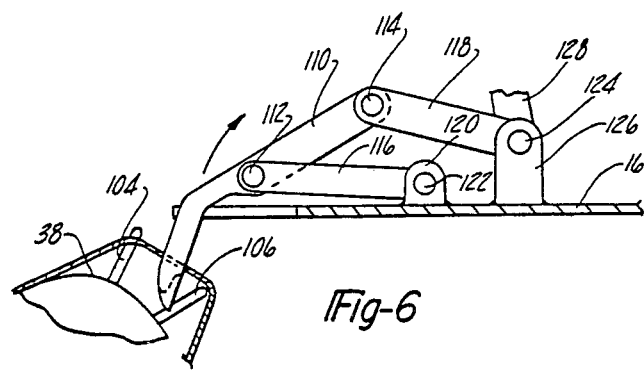
Figure 7:
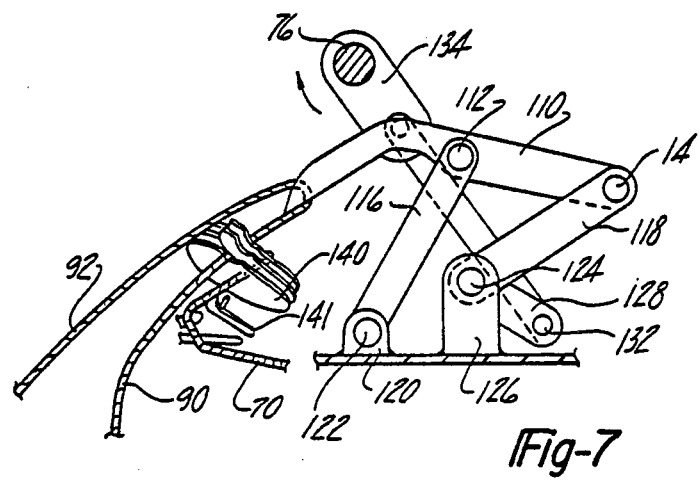

The mechanism of this embodiment which supports the pickup needle 110 is best shown in FIG. 4. Thus, each of the twine pickup needles 110 (there being one pickup needle for each knotter) is pivotally interconnected by pivots 112 and 114 with forward and rear links 116, 118, respectively. The rear end of each of the forward links is interconnected with a bracket 120 by pivot pin 122, brackets 120 being mounted on the top of the bale case. The rear end of each of the rear links 118 is nonrotatably secured to a cross shaft 124 rotatably journalled in brackets 126, also secured to the top of the bale case 16. One end of the cross shaft 124 carries an arm 128. This arm is in turn pivotally interconnected with a drive link 130 by pivot 132, the other end of the drive link being interconnected with arm 134 by pivot pin 136. One end of the arm 134 (remote from the pivot 136) is secured to the knotter shaft 76 and rotates therewith.

The operative end of each of the needles 110 is provided with a point 137 (FIG. 8), and an eye open to one side, the eye being defined by a leading hook portion 138 having an angled or cam surface 139. The knotter is provided with twine disks 140 and a bill hook 141.

Tensioning means are provided to maintain proper tension of the twine during knotting. Thus, the twine extending away from the supply ball 72 passes through guides 142, and a twine brake or drag 144 is disposed between one guide 142 and the supply 72. In addition, there is also a spring mounted pigtail type tensioning device 146 interposed between two other guides 142. The guides 142 and the tensioning means 144 and 146 are all mounted on a lower surface of the bale case 16.

Figure 17:
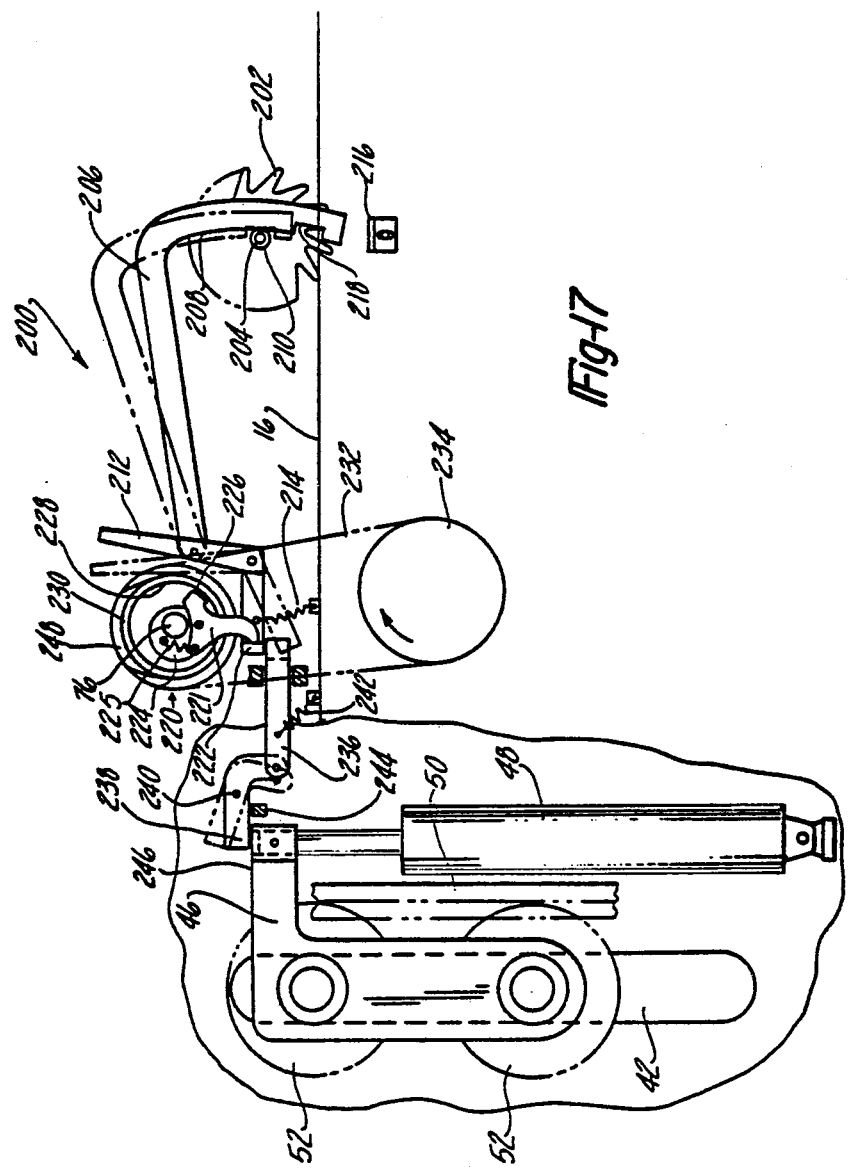
FIG. 17 is a side view of the actuating and coordinating mechanism which is used to initiate operation of the knotter and the twine pickup needles.

An actuating and coordinating mechanism 200 (shown in FIG. 17) includes an actuating mechanism capable of causing a single revolution of the knotter shaft 76 when the proper bale length has been achieved, and a coordinating mechanism capable of preventing initiation of rotation of the knotter shaft except when the pair of rollers have been reciprocated to their upper or first position. The actuating mechanism includes a bale length metering mechanism and a single revolution clutch. The metering mechanism includes a metering wheel 202 fixed on a rotatable shaft 204. A metering arm 206, disposed to one side of the bale case 16 (preferably the left side), is provided with a curved surface 208 which is engaged by a knurled roller 210 mounted on the shaft 204. The forward end of the arm 206 is pivotally secured to a bell crank 212 which, is in turn pivotally mounted on the bale case, the crank 212 being biased in a counterclockwise direction by spring 214. The arm 206 is raised as the bale 88 engages the wheel 202 and causes the wheel and shaft 204 to be rotated, until the proper length, determined by stop 216, is achieved. At this point the arm 206 can be pulled forwardly by the action of spring 214 as the cutout 218 is lined up with the shaft 204 and the knurled roller 210. A single revolution clutch 220 can be engaged if the bell crank rotates from its full line position shown in FIG. 17 to its dotted line position. The clutch 220 includes a dog 221, one end of the dog normally engaging the stop 222 on bell crank 212. The dog 221 is pivotally mounted on the collar 224 which is in turn fixed to the knotter shaft 76. When the one end of the dog is released, a spring 225 will bias the dog 221 in a clockwise direction to bring the pawl 226 into engagement with the cooperating internal surface 228 of the knotter drive sprocket 230.

The knotter drive sprocket is journalled on knotter shaft 76 and is constantly driven by chain 232. After a single revolution the end of the dog 221 will again be engaged by stop 222 to disengage the pawl.

The actuating mechanism described so far can be considered generally conventional. In prior art balers which utilize a plunger to feed material into the bale case 16 the needle actuating mechanism is interconnected with the collar 224, and the movement of the needle, plunger and knotter are all coordinated by mechanical drives, such as for example chain 232. While the disclosed pickup needle and knotter actuating mechanism is interconnected with the collar 224 through the knotter shaft 76, in view of the hydraulic actuation of the feed rollers 36 it is necessary to provide additional means to coordinate the movement of the feeding means 26 with the actuation of the pickup needles. In this regard it should be noted that there is no mechanical drive between the feeding means 26 and the sprocket 230, as the feeding means 26 is driven by hydraulic cylinders 48 and the sprocket 230 is driven by a continuously driven hydraulic motor 234 through chains 232.

The means to coordinate the movement of the pickup needles (as well as the knotter) with the feeding means includes a slidable link 236, and a bell crank 238 pivotally mounted on the baler by pivot pin 240. One end of the link 236 is pivotally interconnected with one end of the crank 238 and spring 242 normally biases the link 236 to its rear or stop position (shown in full lines) and the crank 238 to its stop (or full line) position where it normally contacts stop 244. Every time the cylinders 48 raise the common supports 46 to their fully raised position the top rear top surface 246 of the left hand common support will contact the crank 238 to cause it to rotate from its normal full line position to its raised dotted line position. This movement of the crank 238 will cause the link 236 to move forwardly permitting the bell crank 212, under the action of spring 214, to rotate to its dotted line position, releasing dog 221 which will then initiate movement of the collar 224. Once the dog 221 clears stop 222 a cam lobe 248 on the collar will reset the bell crank 212 permitting arm 206 to drop to its stop position. It should be understood that although bell crank 212 is free to release dog 221 every time the support 46 reaches its uppermost position, that the crank 212 will only be free to move to its dotted line position when the proper length of the bale 88 has been achieved.

Figure 10:
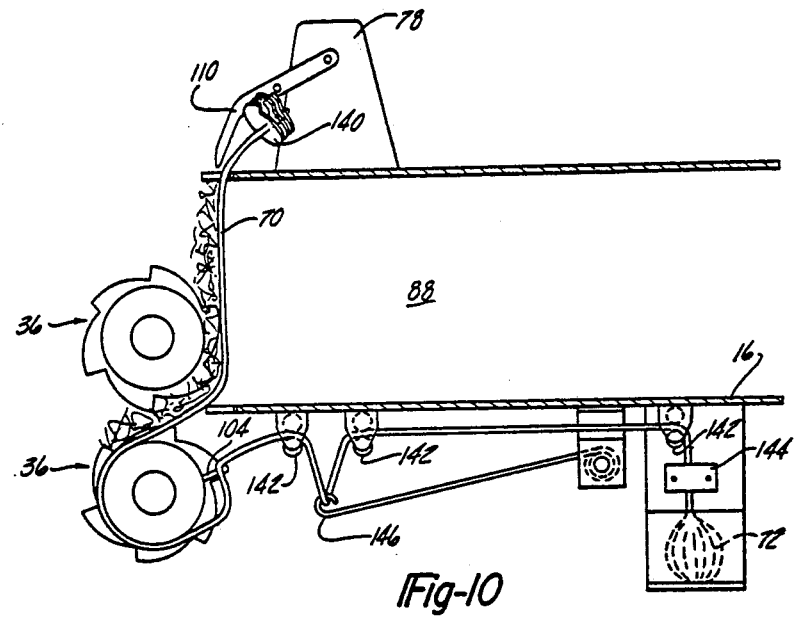
FIGS. 10 through 16 are somewhat schematic illustrations illustrating the sequence of operations.
Figure 11:
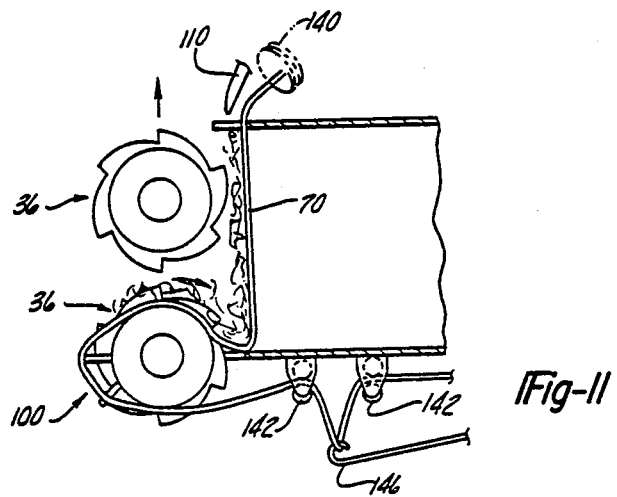
Figure 12:
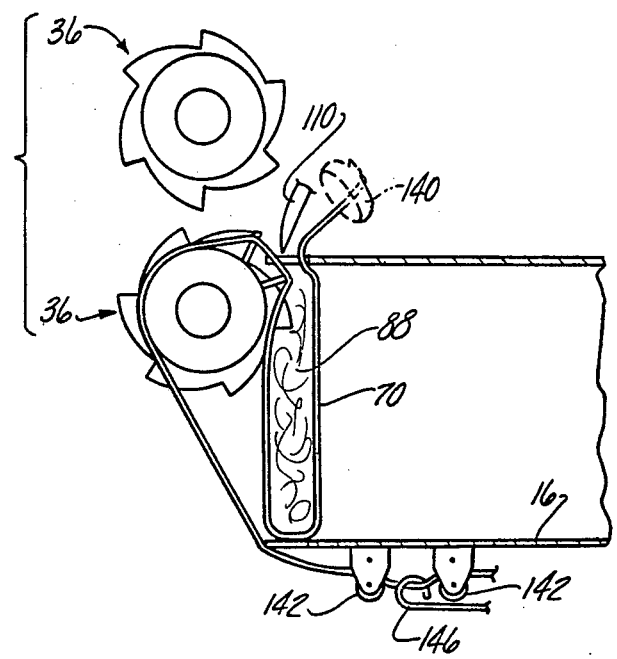
Figure 13:
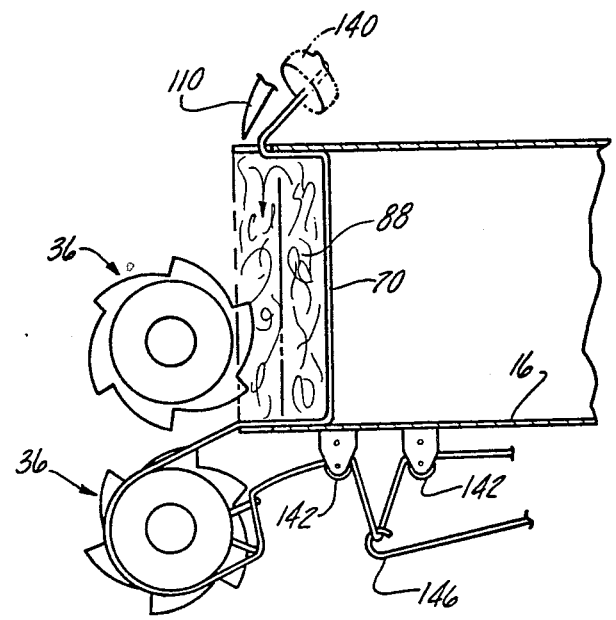
Figure 14:
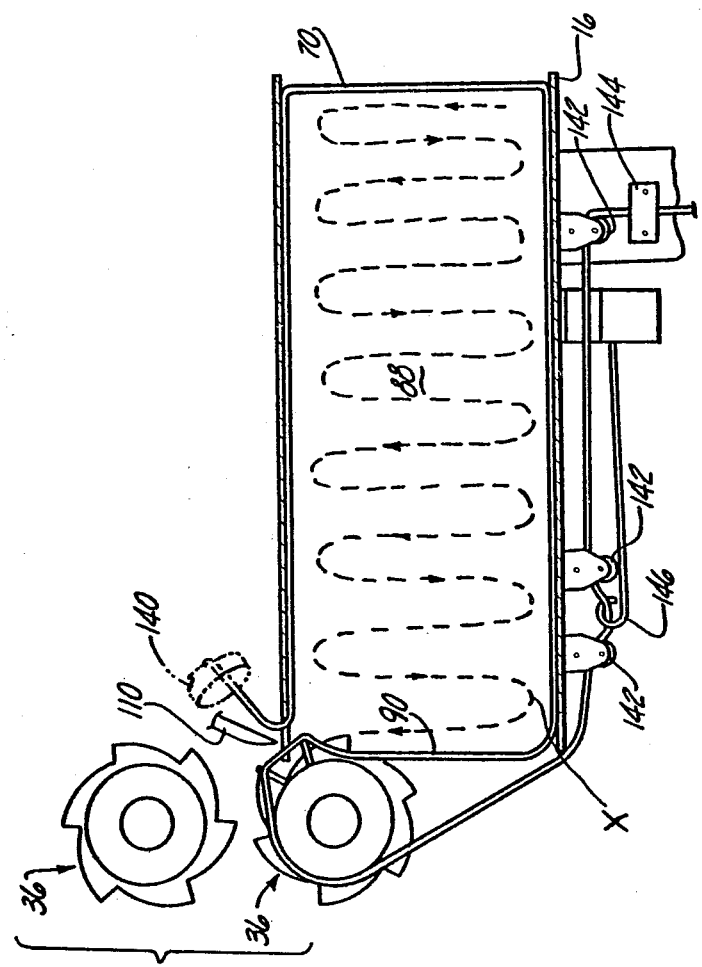
Figure 15:
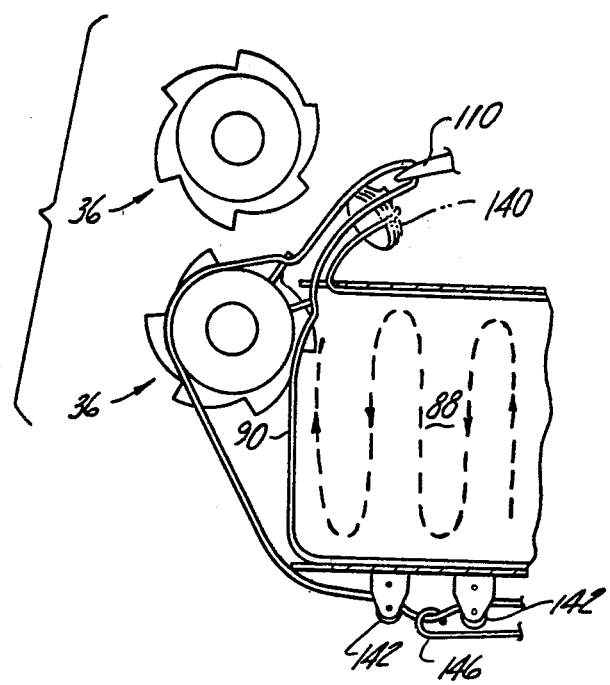

The operation of the tying mechanism can best be appreciated from an inspection of FIGS. 10, 11, 12, 13, 14, 2, 15 and 16 in sequence. FIG. 10 illustrates the position of the various parts essentially at the beginning of a cycle of operation. In this position, the free end of the primary twine is held by the twine disks 140 of the associated knotter mechanism. An intermediate portion of the primary twine passes behind the upper feed roller 36. Another portion of the twine lies within the twine channel formed by the twine channel defining members 108, the twine continuing and passing through the aperture in plate 104. The twine extending between the aperture 104 and the supply spool or reel 72 also passes through guides 142, drag 144 and pigtail 146. It should be noted that customarily a previously formed bale 88 is in the bale chamber 16 at the initiation of the cycle, which bale has been tied off, and that the primary twine 70 lies against the trailing end of the previously formed bale 88. As the rollers 36 move down to the position illustrated in FIG. 10 an initial layer of crop material will be fed into the inlet end of the bale chamber by the feed rollers 36. After the rollers 36 have completed their downward movement and start their upward movement, as indicated in FIG. 11, a further layer of crop material will be fed and compressed into the bale chamber 16 by the feed rollers 36. The completion of this operation is illustrated in FIG. 12 wherein it can be seen that the pigtail 146 is in an almost horizontal position. As the rollers again move down to the position shown in FIG. 13 another layer of crop material is forced into the bale chamber, and as the rollers move down the pigtail 146 moves away from the bale chamber to maintain proper tension upon the twine. In this connection, it should be noted that the pigtail 146 and brake or drag 144 cooperate with each other to act as means which properly maintain the tension on the twine during operation of the baler. This cycle of operation is repeated again and again until the proper length of the bale has been achieved, say at point X in FIG. 14. Thus, when the desired bale length has been attained the mechanism 200 may initiate rotation of the knotter shaft 76. As is the case in the prior art it is necessary that the operation of the knotter shaft be coordinated with the feeding mechanism, in this case the pair of parallel rollers 36. Thus, even though in FIG. 14 the desired bale length was attained when the rollers 36 were in their lowermost position, the rotation of the knotter shaft 76 will not be initiated until the rollers 36 approach their uppermost position illustrated in FIG. 14. Once the knotter shaft starts to rotate the needles will move from their at rest or stationary position illustrated in FIG. 5 downwardly to the pickup position illustrated in FIG. 6 to the fully raised or delivery position where the twine 90 may be engaged by the twine disks 140 and bill hook 141, this being illustrated in FIG. 7 and then back to their at rest position in FIG. 5. It can be seen from FIG. 5 as the arm 134 starts to rotate in the direction of the arrow it will pull on the link 130, moving links 118 and 128 and shaft 124 (the links 118, 128, and shaft 124 acting as a bellcrank) in a counterclockwise direction forcing the needle 110 in a downward direction until it reaches the full down position illustrated in FIG. 6. Each needle 110 is so positioned with respect to the secondary twine carried by the secondary twine supporting mechanism 100 that the point 137 of the needle 110 will initially pass to one side of the secondary portion 90 supported between the apertured plate 104 and the twine channel 108, the twine 90 then being engaged by the angled or cam surface 139 which will cam the twine portion 90 to one side of the hook 138 as the needle continues its downward movement. As the needle 110 reaches its full down position the twine will snap into the eye defined by the hook 138. Then, as the needle moves from its full down position shown in FIG. 6 to its full up position shown in FIG. 7 it will bring the secondary portion 90 of the twine past the twine disks 140. As the needle 110 brings the secondary portion 90 into proper orientation with respect to the knotter mechanism, the operation of the knotter mechanism will be initiated causing the new primary portion 92 to be engaged by the twine disks 140, and the primary and secondary twines 70, 90 respectively, to be engaged by bill hook 141, the knotter mechanism cutting the secondary twine 90 from the new primary twine 92 and tying the primary and secondary twines 70 and 90 together. It should be noted that as the knotter is performing its operation the pickup needle 110 will be returned to its at rest position shown in FIG. 5 due to the continued rotation of the knotter shaft 76. In addition, the rollers will continue their back and forth movement across the inlet end of the bale chamber and will have attained the position approximately shown in FIG. 16, which is essentially the same position that they were in at the initiation of the operation illustrated in FIG. 10.

DESCRIPTION OF A SECOND EMBODIMENT

Figure 19:
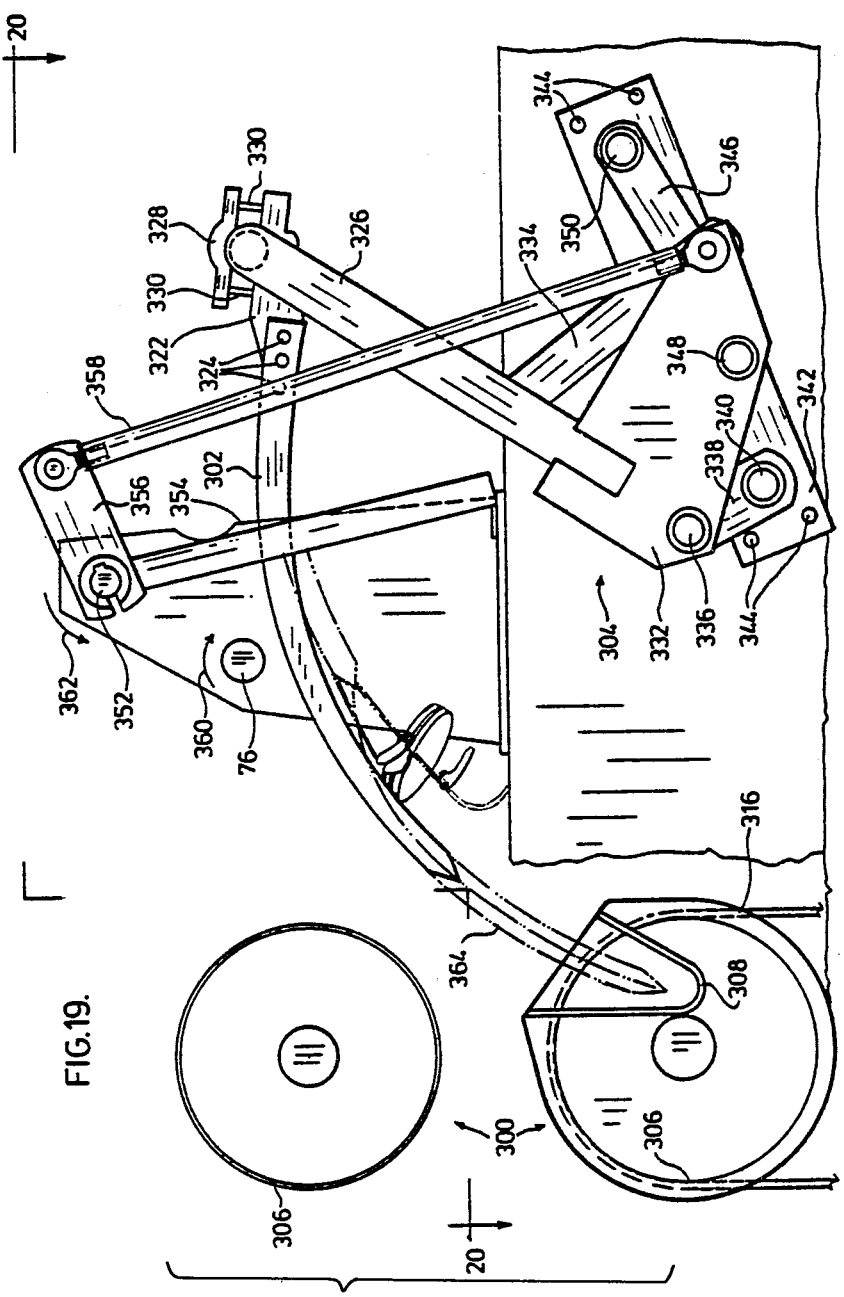
FIG. 19 is a view generally similar to that shown in FIG. 2 illustrating a second embodiment of a baler, twine pickup needle and supporting linkage, and cooperating roller, parts of the knotter mechanism having been eliminated for purposes of clarity.
Figure 20:
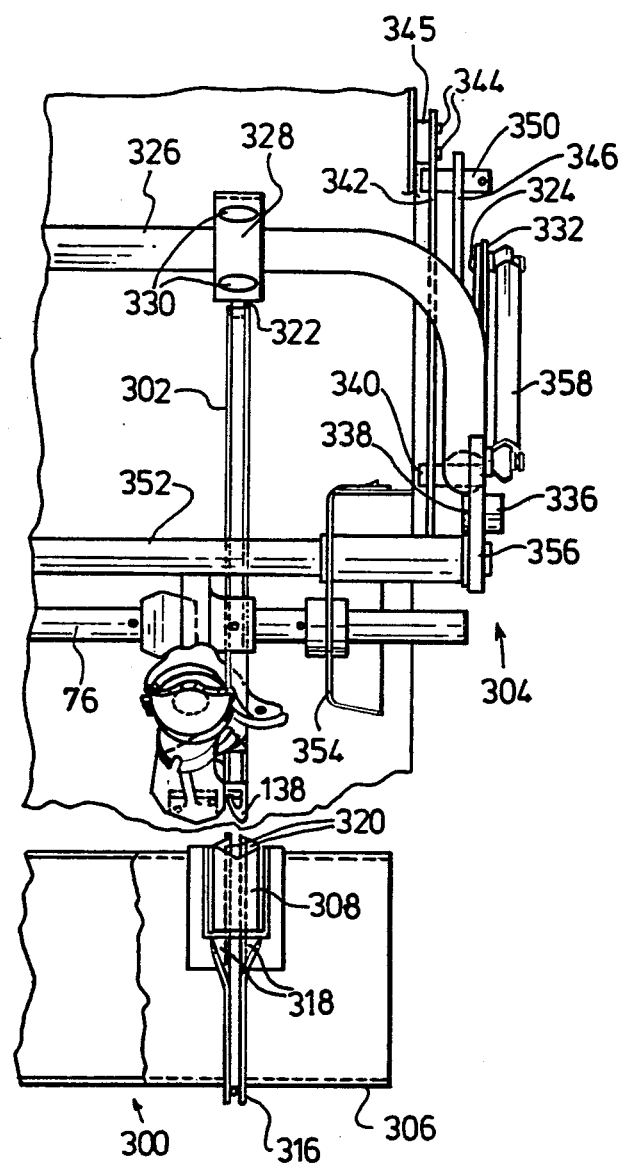
FIG. 20 is a portion of the view taken generally along the line 20—20 in FIG. 19.

Referring now to FIGS. 19 and 20, differing rolls 300 are illustrated, the rolls 300 cooperating with a pickup needle 302 of different construction, the pickup needle 302 being actuated by a differing moving means indicated generally at 304. As noted above in the discussion of FIG. 1 the pair of rollers which form part of the feeding means may be provided with saw tooth like elements. In the embodiment shown in FIGS. 19 and 20 the rolls are not provided with saw tooth like elements, but chains (not illustrated) pass over the rolls, the chains in turn carrying saw tooth like elements. As this feed mechanism is also disclosed in another patent application, it will not be further discussed here. The rolls of this embodiment also differ from the rolls of the first embodiment in that the twine is carried along the entire periphery of the rolls, and raised twine supporting means are not provided. This permits the rolls to move across the face of the bale chamber for a full 360 degrees of rotation or more, if necessary. In order to provide for the pickup of the twine, the rolls are provided with pockets into which the forward end of the needles 302 may project. To this end, the cylindrical section 306 of the lower roller is provided with suitable cutouts equal in number to the knotters carried by the baler, the cutouts receiving pocket forming pieces. The pocket forming pieces may be a casting or a weldment 308. Cooperating with the pocket forming pieces are channel defining elements 316, the twine being disposed between associated channel defining elements. The ends of the channel defining elements 316 adjacent the pocket forming pieces are funnel shaped as at 318 and 320 as can best be seen in FIG. 20.

Figure 3:
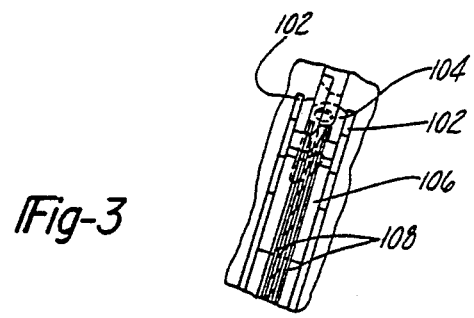
FIG. 3 is a view taken generally along the line 3—3 in FIG. 2.
Figure 8:
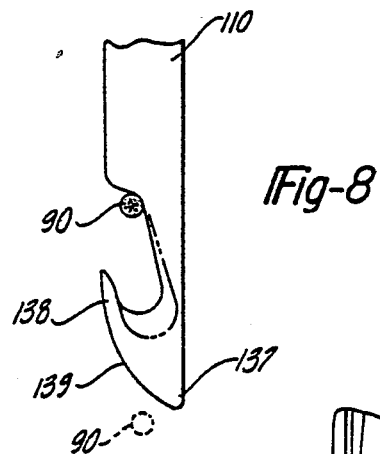
FIG. 8 is a front view of said twine pickup needle.
Figure 9:
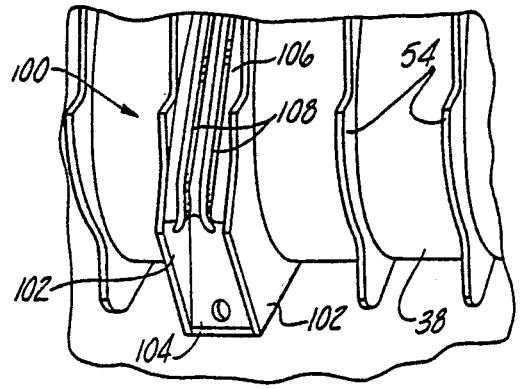
FIG. 9 is a perspective view of a portion of the twine carrying roller adapted to cooperate with the first embodiment of the twine pickup needles and supporting linkage.

The forward end of each of the pickup needles has essentially the same configuration as the pickup needle 110 as illustrated in FIGS. 3 and 8. However, the pickup needle 302 is of much greater length, the rearward end being secured to a bracket 322 by fasteners 324. The bracket 322 is in turn secured to a generally U-shaped member 326 by means of a saddle 328 and fasteners 330 the U-shaped member extending from one side of the bale case to the other. Each end of the U-shaped member is secured by welding or the like, to a pivot plate 332 and a brace 334. Each of the opposed pivot plates 332 is carried by a pivot pin 336 which is carried by one end of an arm 338, the other end of the arm being carried by a further pivot pin 340. The U-shaped member 326 and the pivot plate 332 can be considered as a bell crank which pivots about pivot pin 336. The pivot pin 340 is in turn fixed to a mounting plate 342 which is in turn secured to a side of the bale case by fasteners 344, the fasteners passing through the plate 342 and bolt pad 345. A control arm 346 is secured to a portion of the plate 332 by a further pivot pin 348, the other end of the control arm being secured to the mounting plate 342 by pivot pin 350. Mounted above and to the rear of the knotter shaft 76 is a further rotatable shaft 352, the shaft 352 being journalled for rotation by upstanding supports 354. The shaft 352 is also interconnected with the knotter shaft 76 by a pair of gears (not shown) so that when the shaft 76 initiates one cycle of revolution, the shaft 352 will also initiate one cycle of revolution. The normal position of the parts is shown in FIG. 19 and it can be seen that an upwardly and rearwardly extending arm 356 is nonrotatably carried by the end of the shaft 352, there being one arm at each end of the shaft 352. A link 358 is in turn secured to one end of the arm 356, and to an end portion of the pivot plate 332.

The operation of the needle 302 is similar to that of the needle 110. Thus, when the knotter shaft is initially caused to rotate in the direction of arrow 360 the shaft 352 will be caused to rotate in the direction of the arrow 362. This will cause the link 358 to initially move upwardly to in turn cause the needle to project into the pocket 308 to engage the twine 90 by the hook 138. Continued rotation of the shaft 352 will then cause the link 358 to move downwardly to move the needle upwardly and rearwardly, the point of the needle following the dot dash line indicated by 364 until it reaches its rearmost position or delivery position wherein the twine may be engaged by the twine disks and bill hook. As the shaft 352 completes its rotation the needle will be again returned to its normal at rest position illustrated in FIG. 19.

While this invention has been described with respect to two embodiments, other variations should be obvious to those having ordinary skill in the art. Thus, for example, other mechanisms may be used for supporting the twine on the lower roller other than that specifically illustrated in the figures. Similarly, the needle could be supported for movement by linkage other than that specifically illustrated. Thus, while a preferred structure in which the principles of this invention have been incorporated is shown and described above, it is to be understood that the invention is not to be limited to the particular details, shown and described above, but that, in fact, widely differing means may be employed in the practice of the broader aspects of this invention.

The embodiments of the invention in which an exclusive property or privilege is claimed, are defined as follows:

1. A method for delivering twine to a baler knotter disposed to one side of a bale chamber of a baler, the baler being of the type having feeding means for delivering fibrous material into an inlet end of the bale chamber, the feeding means including a pair of rollers which are moved back and forth across the inlet end of the bale chamber; said method comprising the steps of
   supporting a portion of the twine on one of said rollers as the rollers are moved back and forth across the inlet end of the bale chamber; and
   picking up said portion of the twine after the bale has been formed and bringing said portion to the baler knotter for subsequent tying and cutting.

2. The method as set forth in claim 1 further characterized by the step of maintaining tension on said twine during the preceding steps.

3. The method as set forth in claim 1 wherein said portion of the twine is supported by the roller normally disposed furthest away from the baler knotter.

4. Apparatus for delivering twine to a baler knotter disposed to one side of a bale chamber of a baler, the baler being of the type having feeding means for delivering fibrous material to an inlet end of the bale chamber, the feeding means including a pair of rollers which are moved back and forth across the inlet end of the bale chamber during the formation of a bale; said apparatus being characterized by twine carrying means on one roller of said pair of rollers capable of supporting a secondary portion of the twine; and twine pickup means capable of picking up the secondary portion of the twine and bringing the secondary portion to the baler knotter for subsequent tying and cutting.

5. The apparatus as set forth in claim 4 further characterized by the provision of tensioning means capable of maintaining tension on the secondary portion of a twine as it is supported by said twine carrying means and also when in it is picked up by said twine pickup means.

6. The apparatus as set forth in claim 4 wherein the twine carrying means is disposed on that roller normally disposed furthest away from the baler knotter.

7. The apparatus as set forth in claim 4 wherein the twine carrying means is capable of supporting said secondary portion of the twine in spaced away relationship from the surface of said one roller.

8. The apparatus as set forth in claim 7 wherein the twine carrying means includes an apertured twine carrier plate carried by said one roller and a support member provided with a twine channel, one end of the twine channel being spaced away from the surface of the said one roller, the secondary portion of the twine extending between said one end of the twine channel and the aperture within the twine carrier plate.

9. The apparatus as set forth in claim 4 wherein the twine carrying means is capable of normally supporting said secondary portion of the twine generally along the circumferential periphery of said one roller.

10. The apparatus as set forth in claim 4 or 9 wherein said one roller is provided with a pocket capable of receiving a portion of the twine pickup means, and said twine carrying means includes a twine channel extending about the periphery of said one roller from one end of said pocket to the other end of said pocket, portions of the twine channel adjacent said pocket being funnel shaped.

11. The apparatus as set forth in claim 4 wherein the twine pickup means includes a pickup needle associated with the baler knotter, and means to move the pickup needle from an at rest position where it is disposed adjacent one side of the bale case to a pickup position where it picks a secondary portion of the twine, to a delivery position, and then back to its at rest position.

12. The apparatus as set forth in claim 11 wherein the means to move the pickup needle includes a rotatable shaft having an arm mounted thereon, a bell crank, pivot means supporting an intermediate portion of the bell crank, and a link extending from one end of the arm remote from the rotatable shaft to one end of the bell crank, one end of the pickup needle being connected with the other end of the bell crank.

13. The apparatus as set forth in claim 4, 11 or 12 wherein the pickup needle includes an eye open to one side of the needle, the eye being defined by a leading hook portion provided with a cam surface extending away from the point of the needle.

14. The apparatus as set forth in claim 12 wherein the pickup needle is pivotally interconnected with said other end of the bell crank, and wherein a further link is pivotally secured to an intermediate portion of the pickup needle and, at the other end, to the bale case.

15. The apparatus as set forth in claim 12 wherein the pivot means for supporting an intermediate portion of the bell crank includes an arm, one end of which is pivotally interconnected with the bale chamber, and the other end of said arm being provided with a pivot to which the intermediate portion of the bell crank is secured.

16. The apparatus as set forth in claim 12 or 15 further characterized by the provision of a control arm, one end of which is pivotally secured to a side of the bale chamber, and the other end of which is secured to said bell crank at a location between said intermediate portion of the bell crank and said one end of the bell crank.

* * * * *